(12) United States Patent
Redecker et al.

(10) Patent No.: US 9,211,945 B2
(45) Date of Patent: Dec. 15, 2015

(54) INSULATION ARRANGEMENT WITH VENTILATION OPENINGS FOR AIRCRAFT

(71) Applicant: Airbus Operations GmbH, Hamburg (DE)

(72) Inventors: Robert Redecker, Hamburg (DE); Rainer Mueller, Rosengarten (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 278 days.

(21) Appl. No.: 13/900,726

(22) Filed: May 23, 2013

(65) Prior Publication Data

US 2013/0299630 A1    Nov. 14, 2013

Related U.S. Application Data

(63) Continuation of application No. PCT/EP2011/069167, filed on Oct. 31, 2011.

(60) Provisional application No. 61/417,367, filed on Nov. 26, 2010.

(30) Foreign Application Priority Data

Nov. 26, 2010   (DE) .......................... 10 2010 052 671

(51) Int. Cl.
*B64C 1/00* (2006.01)
*B64C 1/40* (2006.01)
*B64C 1/06* (2006.01)
*B64D 13/06* (2006.01)

(52) U.S. Cl.
CPC . *B64C 1/40* (2013.01); *B64C 1/067* (2013.01); *B64D 2013/0625* (2013.01)

(58) Field of Classification Search
None
See application file for complete search history.

(56) References Cited

U.S. PATENT DOCUMENTS 3,740,905 A * 6/1973 Adams .......................... 52/404.3
3,799,056 A * 3/1974 Colignon ................... 244/117 A (Continued)

FOREIGN PATENT DOCUMENTS

| CA | 2348501 A1 | 5/2000 |
|---|---|---|
| TW | 200811390 A | 3/2008 |
| WO | 2008085288 A1 | 7/2008 |

OTHER PUBLICATIONS

International Searching Authority, International Search Report dated Mar. 19, 2012 for International Application No. PCT/EP2011/069167.

(Continued)

*Primary Examiner* — Medhat Badawi
(74) *Attorney, Agent, or Firm* — Ingrassia Fisher & Lorenz, P.C.

(57) ABSTRACT

An insulation arrangement with two or more insulation packages that overlap such that at least one overlapping region is formed and are arrangeable on a fuselage wall is provided. The insulation packages comprise an insulating material and welded cover films. The cover films are realized in an airtight and waterproof fashion and comprise ventilation openings on a side that is directed toward the fuselage wall in an overlapping region. In this way, pressure variations in the insulation packages can be compensated with relatively dry air that originates from a gap between the insulation packages and the fuselage wall in order to thusly reduce the accumulation of condensation water in the insulation packages.

15 Claims, 7 Drawing Sheets

(56) References Cited

U.S. PATENT DOCUMENTS

| | | | | |
|---|---|---|---|---|
| 3,867,244 | A * | 2/1975 | Adams | 428/182 |
| 4,235,398 | A * | 11/1980 | Johnson | 244/119 |
| 4,646,993 | A * | 3/1987 | Baetke | 244/117 R |
| 4,906,504 | A * | 3/1990 | Skjold Petersen | 428/85 |
| 5,398,889 | A * | 3/1995 | White et al. | 244/119 |
| 5,577,688 | A * | 11/1996 | Sloan | 244/117 R |
| 5,759,659 | A * | 6/1998 | Sanocki et al. | 428/74 |
| 5,788,184 | A * | 8/1998 | Eddy | 244/121 |
| 5,811,167 | A * | 9/1998 | Norvell | 428/76 |
| 5,987,833 | A * | 11/1999 | Heffelfinger et al. | 52/406.2 |
| 6,491,254 | B1 * | 12/2002 | Walkinshaw et al. | 244/118.5 |
| 7,005,175 | B2 * | 2/2006 | Hachenberg et al. | 428/75 |
| 7,083,147 | B2 * | 8/2006 | Movsesian et al. | 244/121 |
| 7,568,659 | B2 * | 8/2009 | Roques et al. | 244/121 |
| 7,584,582 | B1 * | 9/2009 | Hutter, III | 52/506.02 |
| 7,677,500 | B2 * | 3/2010 | Redecker | 244/136 |
| 7,785,694 | B2 * | 8/2010 | Muller et al. | 428/116 |
| 7,951,492 | B2 * | 5/2011 | Kim et al. | 429/246 |
| 8,011,619 | B2 * | 9/2011 | Mueller et al. | 244/121 |
| 8,157,209 | B2 * | 4/2012 | Dittmar et al. | 244/117 R |
| 8,245,974 | B2 * | 8/2012 | Paul | 244/129.1 |
| 8,336,822 | B2 * | 12/2012 | MacGregor et al. | 244/119 |
| 8,453,393 | B2 * | 6/2013 | Schroth et al. | 52/172 |
| 8,490,365 | B2 * | 7/2013 | Mueller et al. | 52/783.1 |
| 8,534,418 | B2 * | 9/2013 | Pachale | 181/292 |
| 8,602,464 | B2 * | 12/2013 | Yadollahi | 292/194 |
| 8,616,498 | B2 * | 12/2013 | Hossain et al. | 244/121 |
| 8,678,318 | B2 * | 3/2014 | Redecker | 244/131 |
| 8,727,281 | B2 * | 5/2014 | Muller et al. | 244/131 |
| 8,728,605 | B2 * | 5/2014 | Payne et al. | 428/74 |
| 8,857,562 | B2 * | 10/2014 | Morgan et al. | 181/284 |
| 8,876,048 | B2 * | 11/2014 | Herrmann et al. | 244/119 |
| 8,882,041 | B2 * | 11/2014 | Mueller et al. | 244/121 |
| 2004/0175516 | A1 * | 9/2004 | Schmitz et al. | 428/34.1 |
| 2006/0240216 | A1 * | 10/2006 | Stepanian et al. | 428/76 |
| 2007/0272320 | A1 * | 11/2007 | Roberson | 138/149 |
| 2008/0032114 | A1 * | 2/2008 | Squires et al. | 428/308.4 |
| 2008/0057334 | A1 * | 3/2008 | Schroth et al. | 428/615 |
| 2008/0182048 | A1 * | 7/2008 | Ouellette et al. | 428/34.1 |
| 2008/0211838 | A1 * | 9/2008 | Zhang | 347/7 |
| 2008/0308676 | A1 * | 12/2008 | Muller | 244/119 |
| 2009/0090812 | A1 * | 4/2009 | Boock et al. | 244/1 N |
| 2009/0250293 | A1 * | 10/2009 | Gleine et al. | 181/292 |
| 2009/0308975 | A1 * | 12/2009 | MacGregor et al. | 244/119 |
| 2010/0320318 | A1 * | 12/2010 | Roth et al. | 244/118.5 |
| 2011/0146830 | A1 * | 6/2011 | Carusiello et al. | 138/145 |
| 2011/0284689 | A1 | 11/2011 | Thomas et al. | |
| 2012/0037259 | A1 * | 2/2012 | Shumate et al. | 138/149 |
| 2013/0240668 | A1 * | 9/2013 | Holm et al. | 244/1 N |
| 2013/0299630 | A1 * | 11/2013 | Redecker et al. | 244/1 N |
| 2014/0057068 | A1 * | 2/2014 | Fair | 428/99 |

OTHER PUBLICATIONS

German Patent and Trademark Office, Office Action dated Feb. 12, 2014 for German Patent Application No. 102010052671.1.

* cited by examiner

Prior Art

INSULATION ARRANGEMENT WITH VENTILATION OPENINGS FOR AIRCRAFT

CROSS-REFERENCE TO RELATED APPLICATIONS

This is a continuation of International Patent Application PCT/EP2011/069167, filed Oct. 31, 2011, which application claims priority to German Patent Application No. 10 2010 052 671.1, filed Nov. 26, 2010 and to U.S. Provisional Patent Application No. 61/417,367, filed Nov. 26, 2010, which are each incorporated herein by reference in their entirety.

TECHNICAL FIELD

The technical field pertains to an insulation arrangement for thermally and acoustically insulating a cabin of an aircraft with two or more insulation packages. The technical field furthermore pertains to an insulation package, as well as to an aircraft with a cabin and an insulation arrangement according to the present disclosure.

BACKGROUND

The fuselage structures of aircraft are usually lined with mat-like insulation packages that consist of a puffy mineral fiber material and welded cover films. These insulation packages fulfill several functions that, in addition to the thermal insulation of systems in the interior of the aircraft and of a passenger cabin formed in the fuselage structure, also include a sufficient protection against burn-through, a barrier function for condensate in order to protect systems and the cabin from dripping water and an acoustic insulation of the cabin. The fiber material used in conventional insulation packages restricts the air convection in the insulating mat and ensures a high thermal insulating effect due to this restricted air convection and its high heat transfer resistance. In an upper region of a fuselage structure of an aircraft, the outwardly directed film is usually realized in a waterproof fashion and therefore fulfills the function of a condensate barrier that protects the systems and the cabin from dripping water. The inwardly directed cover film of the insulation packages is usually realized in the form of a membrane or perforated and therefore permeable to air in order to ensure a pressure compensation between air enclosed in the insulation packages and the surroundings and to simultaneously prevent the insulation packages from inflating and shrinking during pressure variations in the fuselage structure.

The insulation packages are usually installed in an overlapping fashion in order to divert condensation water and to prevent this condensation water from being admitted into the cabin. The overlaps of the insulation packages are usually permeable to air and ensure a pressure compensation between air in the cabin and air enclosed between the insulation packages and the fuselage structure. During a pressure variation in the fuselage, this air permeability prevents undesirable compressive forces from acting upon the insulation packages and their fasteners.

Air enclosed between the insulation packages and a fuselage structure that is relatively cold during a flight is cooled off and, due to the increasing density, reaches lower-lying regions of the fuselage structure in the form of a convection current, wherein this air is then drawn into a recirculation circuit of an air-conditioning system of the aircraft and admixed to the supply air for the cabin. The convection current creates a suction effect that continuously draws warm and humid cabin air, among other things, through the overlaps of the insulation packages. The moisture contained in the cabin air condenses and freezes on the fuselage structure, and the air flowing along the fuselage structure is cooled off and partially dehumidified by the condensation process. This phenomenon leads to a circulatory convection current between the insulation packages and the fuselage structure.

Condensation water that precipitates on and drips off the fuselage structure is diverted into lower-lying regions of the fuselage structure by the condensate barrier, i.e., the outwardly directed waterproof film of the insulation packages.

The thermal insulation of the cabin relative to the cold fuselage wall is essentially achieved with the air cushion between the insulation packages and the fuselage structure, as well as the high heat transfer resistance of the insulation packages. Assuming the insulation packages have conventional dimensions, the location with the dew point temperature of the cabin air is situated within the insulation packages when the fuselage structure is very cold. Due to pressure variations and diffusion effects, warm and humid cabin air is continuously admitted into the insulation packages through the perforated film facing the cabin. Condensation takes place if this air penetrates into the insulation material up to the location with the dew point temperature. Due to their strong capillary action, the mineral fibers absorb drops of the condensate and prevent the drainage thereof. The steadily increasing water content in the insulation packages resulting thereof reduces the insulating effect and shifts the location of the dew point toward the cabin such that the condensation and the resulting water absorption of the insulation packages are additionally increased. If the drying time does not suffice, the insulation packages therefore can absorb significant quantities of water such that their weight may dramatically increase and the efficiency of the insulation packages may steadily decrease.

EP 1 124 720 B1 and US 20040175516 A1 disclose an insulation arrangement for the interior insulation of an aircraft, in which insulation packages are completely enclosed by a film cover and arranged within an intermediate space, wherein the film cover is realized with a film material that allows the diffusion of gases and liquids.

In addition, other objects, desirable features and characteristics will become apparent from the subsequent summary and detailed description, and the appended claims, taken in conjunction with the accompanying drawings and this background.

SUMMARY

Accordingly, provided is an insulation arrangement for thermally and acoustically insulating a cabin of an aircraft, in which the absorption of moisture is reduced or entirely eliminated.

The weight of such an insulation arrangement should, if possible, not be higher than that of a conventional insulation arrangement. It should furthermore be able to provide the same or an improved insulating quality.

One exemplary embodiment of the present disclosure comprises several insulation packages that are arrangeable in an intermediate space enclosed by a cabin paneling and a fuselage wall of the aircraft and include an insulating material and welded cover films, wherein all cover films are realized in an airtight and waterproof fashion and the insulation packages comprise ventilation openings that penetrate the cover films and are arranged in such a way that they are fluidically connected to a gap formed between the insulation arrangement and the fuselage wall.

Insulation packages of this type can be distinguished from insulation packages according to the prior art in that they are completely enclosed in a continuously non-perforated, airtight and waterproof welded film such that an air exchange with the interior of the insulation packages can only take place through the ventilation openings. Due to the fluidic connection with an air cushion between the fuselage wall and the film of the insulation packages that is directed toward the fuselage wall, air is only introduced into the insulation packages through the ventilation openings arranged at this location. Since the air cushion is continuously in contact with the relatively cold fuselage wall during a flight and condensation steadily takes place on the fuselage wall in this region, the air is also relatively dry at this location. The temperature gradient from a passenger cabin to the fuselage wall through the insulation arrangement causes air being admitted into the insulation packages from this region to even be slightly heated up again such that the relative humidity of this inflowing air is lowered due to the previously occurring condensation. When the pressure in the cabin drops, the air current in the insulation packages in the aircraft therefore is relatively dry and not subjected to any further condensation in the interior of the insulating material.

In this context, the term insulation package refers to all insulation packages used in an aircraft, wherein these insulation packages may be arranged vertically or horizontally and cover skin panels, as well as reinforcing components such as frames.

It should be noted that the construction principle according to the present disclosure described above does not necessarily have to be applied to all insulation packages positioned within an insulation arrangement, but that it would also be possible to provide only a few or even only one insulation package with ventilation openings if this is deemed practical for the respective application.

This paradigm shift in the design of the required ventilation of insulation packages results in a significant improvement of the moisture balance in the insulation arrangement. This practically makes it possible to completely eliminate the risk of condensation water accumulating in insulation packages.

In one exemplary embodiment of the present disclosure, the ventilation openings are respectively arranged in an overlapping region between two insulation packages. The thusly obtained shielding effect makes it possible to at least largely prevent condensation water from the air cushion from being admitted into the ventilation openings.

In one exemplary embodiment, the insulation packages respectively comprise a hem that respectively protrudes into an overlapping region, wherein the insulation packages are arranged in the overlapping region in such a way that the ventilation openings are covered by the hem of an insulation package. Although this enables condensation water to freely drip or run down during condensation effects between the insulation packages and the fuselage wall of the aircraft, such an imbricated arrangement prevents the admission of the condensation water into the ventilation openings. In this context, a hem should be interpreted as a film edge, at which the cover films of two sides of an insulation package are welded to one another. The hem may extend laterally, i.e., essentially parallel to a longitudinal and/or lateral axis of the cabin, as well as upright, i.e., essentially parallel to a vertical axis of the cabin.

This is particularly advantageous in instances, in which the insulation packages are arranged vertically and the ventilation openings are covered by a hem of an insulation package lying thereon.

In one exemplary embodiment, the ventilation openings may also be covered with cover flaps. These cover flaps may be made of a thin, flat film-like material in order to create the least additional weight possible and to allow a simple manufacture. If possible, the cover flaps should be realized in such a way that, when air flows into the ventilation openings, they do not tend to be entrained by the air current and pressed onto the ventilation openings such that they are hermetically covered. It could be advantageous to bond such cover flaps to the film of the respective insulation package near the ventilation openings to be covered, namely with a dedicated attachment surface, and to realize the cover flaps with a sharp bend directly adjacent, above and/or underneath the corresponding ventilation opening such that the cover flap body is reliably spaced apart from the respective ventilation opening in a largely dimensionally stable fashion. Suitable materials are thermoplastic polymers or thin sheets of aluminum or steel that are elastic and impair an integration of insulation packages as little as possible. However, thermosetting polymers or ceramic materials could conceivably also be used.

In one exemplary embodiment, the ventilation openings could be closed with valve bodies that only allow an inflow into the insulation packages in the presence of a sufficient differential pressure. This furthermore reduces the probability of moisture being admitted into the insulating material.

In one exemplary embodiment, the ventilation openings comprise a cover of an open-meshed, air-permeable woven material that immediately binds impacting water drops due to its capillary action and at least partially diverts these water drops away from the ventilation opening. In this way, ventilation openings can be prevented from being completely sealed. The continuous flow of air past the covers makes it possible to quickly remove any potential moisture from these covers.

In one exemplary embodiment, the ventilation openings may be arranged on an upper end of a vertically arranged lower insulation package in an overlapping region such that air from the intermediate space between insulation packages and the fuselage wall needs to flow around the lower end of an insulation package that overlaps toward the fuselage wall via an undercut in order to reach a ventilation opening on the upper end of the lower insulation package that is directed closer to the cabin. In this way, the ventilation openings can be very well shielded against the admission of condensation water without further measures.

The ventilation openings may likewise be arranged on a lower end of a vertically arranged upper insulation package that is directed closer to the fuselage wall in an overlapping region, wherein a ventilation flap is situated above the ventilation opening. In this way, air that tends to still be somewhat dry can be taken in for ventilating the insulation package with a slightly lower temperature than in the arrangement of the ventilation openings at a location that is situated farther from the fuselage wall.

In one exemplary embodiment, the ventilation openings are arranged on a lower end of a vertically arranged insulation package, namely on a side that is directed away from the fuselage wall in the overlapping region. The ventilation openings are generally positioned near a lower hem of the insulation package such that a compensation air current needs to flow around the hem in order to reach the ventilation openings. The ventilation openings also can be shielded from condensation water particularly well in this way.

The present disclosure also provides an insulation package that comprises ventilation openings according to the above-described operating principles. Furthermore, the present disclosure provides an aircraft comprising a fuselage and a cabin that is formed in the fuselage and thermally and acoustically insulated by means of an insulation arrangement according to the present teachings.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
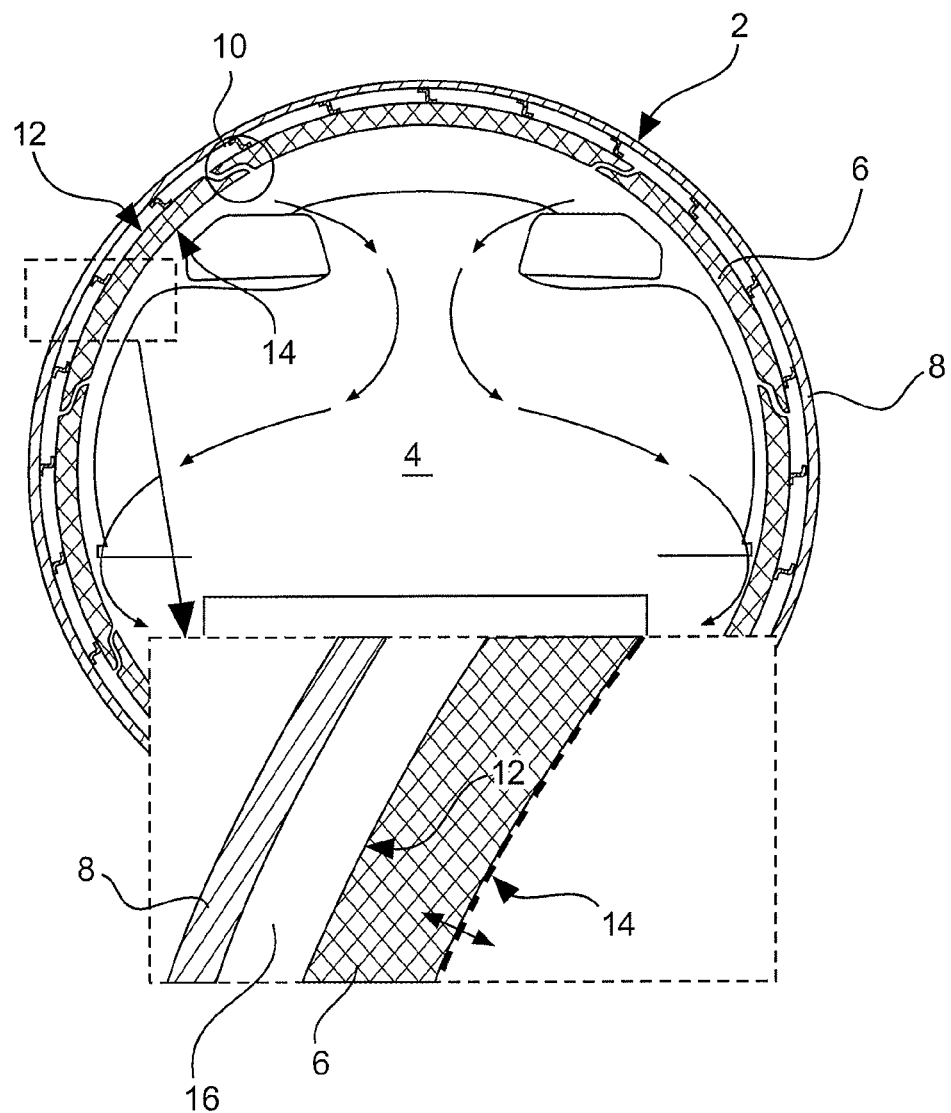
FIG. 1 shows an insulation arrangement according to the prior art.

FIG. 1 shows a cross section through an aircraft fuselage 2 according to the prior art with a cabin 4 that is formed in the fuselage and thermally and acoustically insulated relative to a fuselage wall 8 with the aid of insulation packages 6. In this case, the insulation packages 6 overlap one another and form overlapping regions 10. An outer film 12 of the insulation packages 6 that is directed toward the fuselage wall 8 usually is realized in a completely airtight and waterproof fashion while a film 14 that is directed toward the cabin 4 usually is permeable such as, for example, at least sectionally perforated in order to allow a pressure compensation in the insulation packages 6.

A gap 16 is formed between the insulation packages 6 and the fuselage wall 8, wherein air is in contact with the fuselage wall 8 that, for example, has a temperature in the range between about −55° C. and about −30° C. while cruising in said gap such that the density of the air increases as it cools and the air begins to flow into the lower regions of the fuselage 2 under the influence of the gravitational force. This effect is referred to as a convection current. Due to this convection current, air is drawn from the cabin 4 into the gap 16, particularly through the overlapping regions 10, in order to be incorporated into a circulatory convection current.

The permeable film 14 that is directed toward the cabin 4 makes it possible for a compensation current to flow into the insulation packages 6 and out of the insulation packages 6 during pressure variations within the fuselage 2. In this way, the insulation packages 6 are prevented from inflating when the pressure in the fuselage 2 drops or from shrinking when the pressure increases. Due to the arrangement of the perforation in the direction of the cabin 4, the air admitted into the insulation packages has a temperature of approximately 23° C. and therefore is relatively warm and a relative humidity of about 15 to about 20% and therefore is comparatively humid, wherein this air encounters a lower temperature level upon being admitted into the insulation packages such that the relative humidity increases as the air advances into the insulation packages 6. In conventionally designed insulation packages 6, the location of the dew point for the air from the cabin 4 therefore is also situated within the insulation packages 6 such that at least part of the moisture contained in the cabin air condenses within the insulation packages 4 and is held therein due to the capillary action in such a way that at least a significant part of the condensation water cannot drip out.

Figure 2:
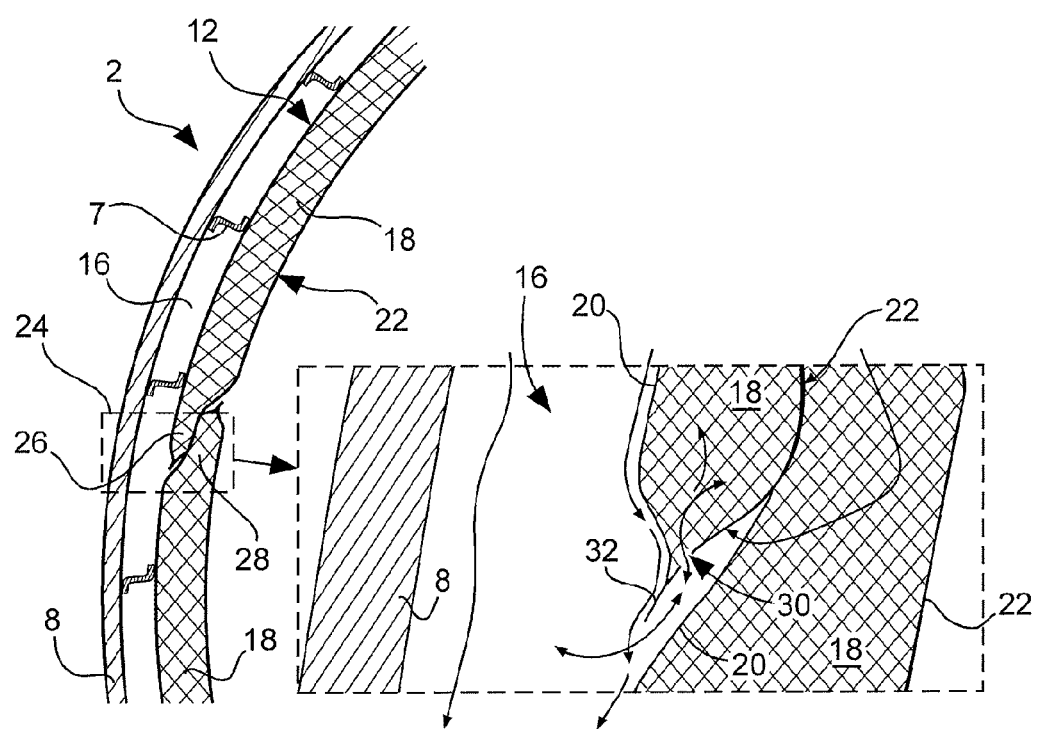
FIG. 2 shows an insulation arrangement according to the present disclosure in the form of a sectional representation.

In an insulation arrangement according to the present disclosure according to FIG. 2, insulation packages 18 are provided that comprise completely airtight and waterproof films 20 and 22 on both sides. According to the present disclosure, the insulation packages 18 are arranged in such a way that overlapping regions 24 are formed, in which a lower end 26 and an upper end 28 of insulation packages 18 respectively lie on top of one another, wherein the respective insulation package 18 directed toward the upper side of the fuselage 2 is arranged closer to the fuselage wall 8 in the overlapping region 24 than the respective insulation package 18 situated thereunder.

The peculiarity of the insulation arrangement according to the present disclosure can be seen in that it is provided with ventilation openings 30 that are directed toward the fuselage wall 8 and serve for realizing a pressure compensation. Due to the positioning, only air from the air gap 16 can be admitted into the insulation packages 18, in which the temperature level is higher than in said air gap 16 such that the air flowing into the insulation packages 18 through the ventilation openings 30 is comparatively dry due to the prior condensation of the moisture contained in the air from the air gap 16 and heated therein due to the higher temperature level. The thermodynamic correlations are elucidated below with the aid of the temperature entropy diagram shown in FIG. 4.

FIG. 2 shows an exemplary positioning of the ventilation openings 30 on a lower end 26 of an insulation package 18 in a region near a lower hem 32, around which the air from the air gap 16 needs to flow in order to be admitted into an intermediate space between two insulation packages 18 in the overlapping region 24, toward which the ventilation openings 30 are directed. This makes it possible to prevent the admission of condensation water that, for example, runs down along the fuselage wall 8 or drips onto the side of the insulation package 18 that is directed toward the fuselage wall 8 into the ventilation openings 30.

Figure 3:
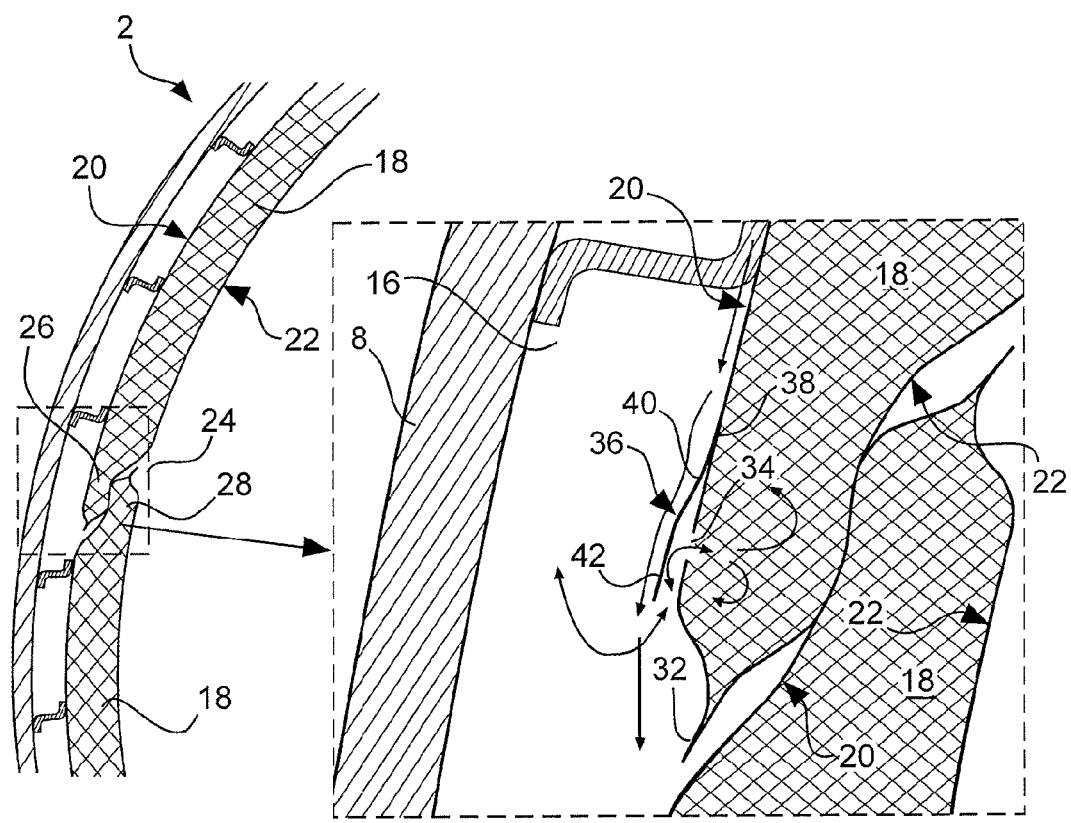
FIG. 3 shows a detail of an exemplary embodiment of an insulation arrangement according to the present disclosure.

FIG. 3 shows a slight modification, in which the ventilation openings 34 are arranged on the lower end 26 in the overlapping region 24, however, on a side that is directed toward the fuselage wall, wherein these ventilation openings 34 are covered by a cover flap 36. This cover flap 36 comprises an attachment surface 38 that makes it possible to connect the cover flap 36 to the film that is directed toward the fuselage wall, for example, by means of bonding. The attachment surface 38 is followed by a sharp bend 40, by means of which the covering region 42 of the cover flap is spaced apart from the ventilation openings 34 in order to allow an undisturbed flow of air into and out of the air gap 16. The material of this cover flap 36 needs to be chosen such that the covering region 42 of the cover flap is prevented from adapting to the ventilation openings 34 in such a way that an inflow is prevented at any conceivable inflow speed. However, the material also needs to have such an elasticity that the insulation packages 18 can be installed without difficulty.

Figure 4:
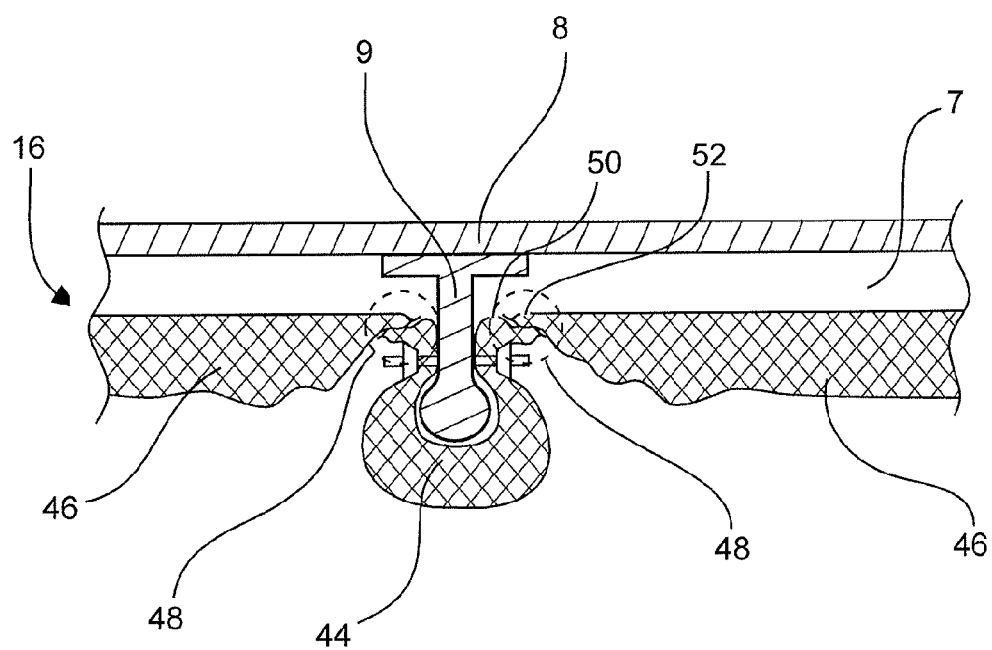
FIG. 4 shows an insulation arrangement according to the present disclosure with frame mats and panel mats.

FIG. 4 shows a sectional representation of an insulation arrangement according to the present disclosure, in which frame insulation packages 44 and panel insulation packages 46 form overlapping regions 48. The insulation packages 44 and 46 also comprise ventilation openings 50 and 52 that are fluidically connected to the gap 16 in order to realize the ventilation. Depending on the direction and intensity of a component of the gravitational force that is directed toward the fuselage wall 8 or away from the fuselage wall 8, it is proposed to cover the ventilation openings 50 of panel insulation packages 46 with frame insulation packages 44 or vice versa.

With respect to the design of conventional aircraft fuselages with longitudinal reinforcing elements 7, it could also be advantageous to arrange the ventilation openings of all or only a few insulation packages in the vicinity of the contact points of the longitudinal reinforcing elements 7 such that the ventilation openings are shielded toward the cabin 4 by two adjacent longitudinal reinforcing elements 7.

Figure 5A:
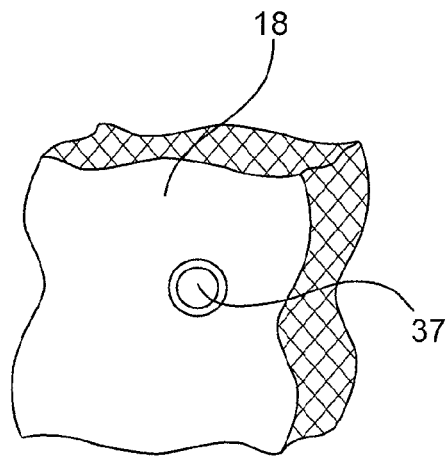
FIG. 5A to FIG. 5D respectively show details of an insulation package with differently designed ventilation openings.

FIGS. 5A to 5D show examples of different optional designs of ventilation openings. For example, FIG. 5A shows a valve body 37 that only allows an air current to flow into the insulation package 18 or out of the insulation package 18 when a minimum pressure defined by the design of the valve body is exceeded. This may assist in preventing the inadvertent admission of condensation water.

Figure 5B:
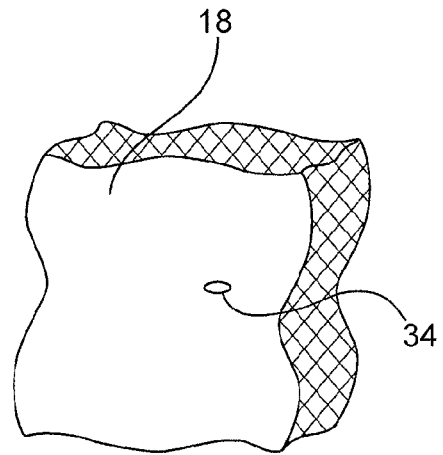

FIG. 5B shows a completely unprotected ventilation opening 34 that is particularly suitable for being covered by a hem of another insulation package in order to prevent the inadvertent admission of condensation water.

Figure 5C:
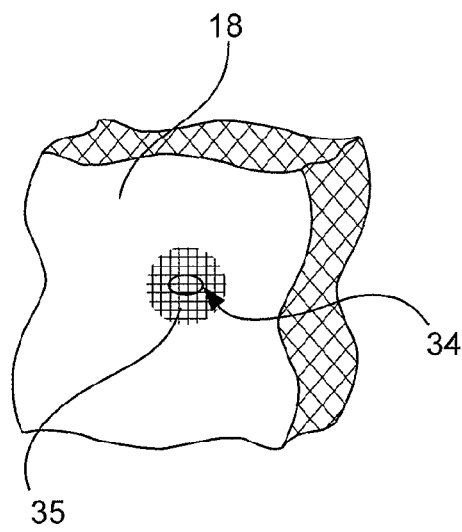

FIG. 5C shows a cover of a ventilation opening 34 in the form of a screen-like or fabric-like woven material section 35 that channels condensation water radially outward and away from the ventilation opening 34 particularly well such that it can once again evaporate by utilizing the entire surface area of the woven material section 35.

Figure 5D:
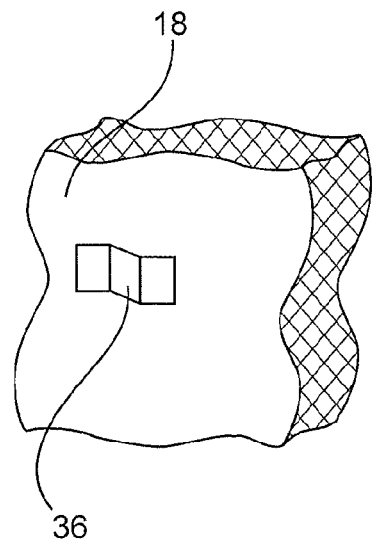

FIG. 5D shows a cover 36 for a ventilation opening that comprises a film-like and/or sheet-like thin material, wherein in one example, this thin material is elastic and always causes a shielding effect a short distance in front of the respective ventilation opening.

Figure 6:
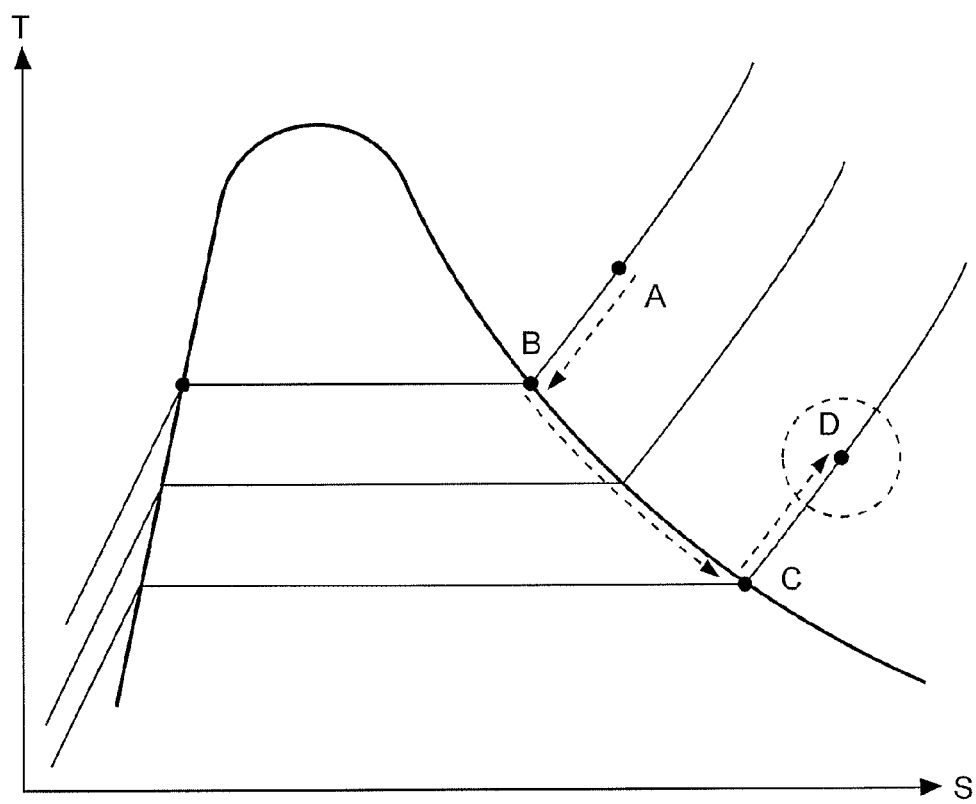
FIG. 6 shows a temperature entropy diagram for elucidating the insulation arrangement according to the present disclosure.

FIG. 6 elucidates the advantages of the insulation arrangement according to the present disclosure with the aid of a temperature entropy diagram (T-s diagram). Air from the cabin is in a state A, in which water vapor is present. If this air is admitted into the air gap 16, it reaches the fuselage wall 8 in order to not only assume a lower temperature, but also to release dissolved water vapor by means of condensation. The air flowing into the air gap 16 therefore is saturated and in the state B. The temperature of this air is further reduced due to its flow along the fuselage wall 8, wherein the partial water vapor pressure steadily and clearly decreases due to the progressive condensation until the air reaches the state C. When air in this state is admitted into the insulation packages 18, it is heated because the temperature level within the insulation packages 18 is higher than in the air gap 16 as the penetration depth advances. Since only a limited quantity of water vapor is present in the air, the relative humidity drops due to the heating process such that the state D of the air flowing into the insulation package moves even father from the condensation line. This is equivalent to a dry air current being admitted into the insulation packages 18 and not leading to progressive condensation therein.

Figure 7:
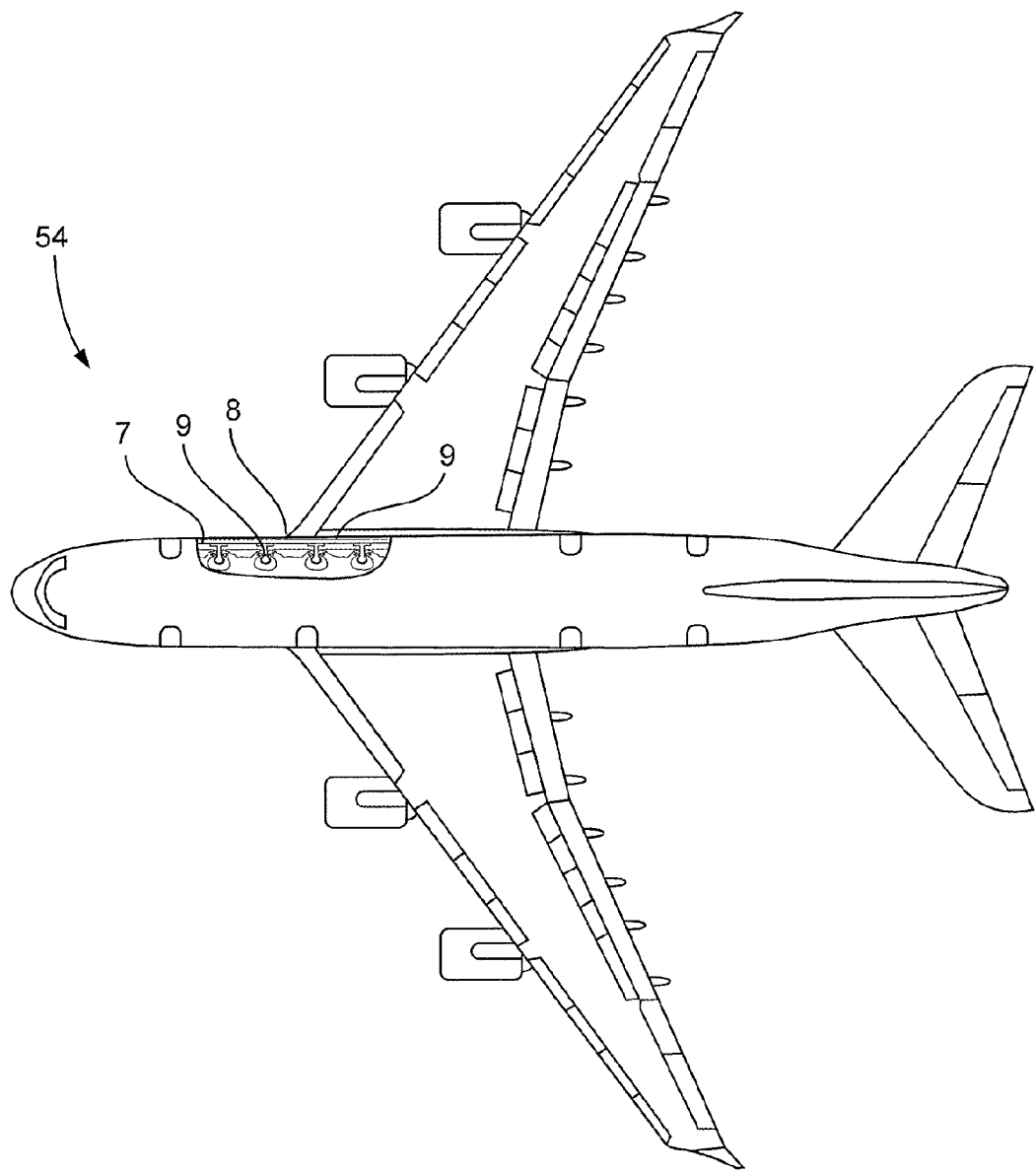
FIG. 7 shows an aircraft with an insulation arrangement according to the present disclosure.

FIG. 7 shows an aircraft 54 with an aircraft fuselage 2, in which a cabin 4 is formed and thermally and acoustically insulated with the aid of an insulation arrangement according to the present disclosure.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. An insulation arrangement for thermally and acoustically insulating an aircraft, comprising:
    a plurality of insulation packages that are arrangeable in an intermediate space enclosed by a cabin paneling and a fuselage wall of the aircraft and comprise an insulating material and welded cover films,
    wherein all cover films are realized in an airtight and waterproof fashion, and the plurality of insulation packages comprise ventilation openings that penetrate the cover films and are arranged in such a way that they are fluidically connected to a gap formed between the insulation arrangement and the fuselage wall;
    wherein cover flaps are arranged on at least one of the plurality of insulation packages for covering ventilation openings of the at least one insulation package; and
    wherein the cover flaps are made of a flat, film-like material and comprise an attachment surface, as well as a bend arranged in between.

2. The insulation arrangement of claim 1,
    wherein the ventilation openings are respectively arranged in an overlapping region between two of the plurality of insulation packages.

3. The insulation arrangement of claim 1,
    wherein the plurality of insulation packages each respectively comprise a hem that respectively protrudes into an overlapping region and the plurality of insulating packages are arranged in a respective overlapping region in such a way that ventilation openings are respectively covered by a hem of an adjacent one of the plurality of insulation packages.

4. The insulation arrangement of claim 1,
    wherein the ventilation openings are closed with valve bodies that open once a predefined differential pressure is reached.

5. The insulation arrangement of claim 1,
    wherein the ventilation openings are covered with an open-meshed, air-permeable woven material section.

6. The insulation arrangement of claim 1,
    wherein the ventilation openings are arranged on an upper end of a vertically arranged lower one of the plurality of insulation packages in an overlapping region.

7. The insulation arrangement of claim 1,
    wherein the ventilation openings are arranged on a lower end of a vertically arranged upper one of the plurality of insulation packages that is directed closer to a fuselage wall, wherein the ventilation openings are covered with cover flaps.

8. The insulation arrangement of claim 1, wherein the ventilation openings are arranged on a lower end of at least one upper insulation package of the plurality of insulation packages and on a side that is directed away from the fuselage wall.

9. An aircraft, comprising:
a fuselage;
a cabin that is formed in the fuselage; and
an insulation arrangement that includes a plurality of insulation packages that are arrangeable in an intermediate space enclosed between the cabin and the fuselage, each of the plurality of insulation packages having an insulating material and welded cover films,
wherein all cover films are realized in an airtight and waterproof fashion, and the plurality of insulation packages comprise ventilation openings that penetrate the cover films and are arranged in such a way that they are fluidically connected to a gap formed between the insulation arrangement and the fuselage;
wherein cover flaps are arranged on at least one of the plurality of insulation packages to cover ventilation openings of the at least one insulation package; and
wherein the cover flaps are made of a flat film-like material and comprise an attachment surface, as well as a bend arranged in between.

10. The aircraft of claim 9, wherein the ventilation openings are respectively arranged in an overlapping region between two of the plurality of insulation packages.

11. The aircraft of claim 9, wherein the plurality of insulation packages each respectively comprise a hem that respectively protrudes into an overlapping region and the plurality of insulating packages are arranged in a respective overlapping region in such a way that ventilation openings are respectively covered by a hem of an adjacent one of the plurality of insulation packages.

12. The aircraft of claim 9, wherein the ventilation openings are closed with valve bodies that open once a predefined differential pressure is reached.

13. The aircraft of claim 9, wherein the ventilation openings are covered with an open-meshed, air-permeable woven material section.

14. The aircraft of claim 9, wherein the ventilation openings are arranged on an upper end of a vertically arranged lower one of the plurality of insulation packages in an overlapping region.

15. The aircraft of claim 9, wherein the ventilation openings are arranged on an end of a vertically arranged one of the plurality of insulation packages that is directed to a fuselage wall, wherein the ventilation openings are covered with cover flaps.

* * * * *